United States Patent
Nakamura

(10) Patent No.: US 9,390,479 B2
(45) Date of Patent: Jul. 12, 2016

(54) IMAGE PROCESSING DEVICE AND IMAGE PROCESSING METHOD

(71) Applicant: Satoshi Nakamura, Kanagawa (JP)

(72) Inventor: Satoshi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 72 days.

(21) Appl. No.: 14/510,167

(22) Filed: Oct. 9, 2014

(65) Prior Publication Data

US 2015/0139566 A1    May 21, 2015

(30) Foreign Application Priority Data

Nov. 20, 2013 (JP) .................................. 2013-239972

(51) Int. Cl.
*G06K 9/40* (2006.01)
*G06T 5/00* (2006.01)
*G06T 5/50* (2006.01)

(52) U.S. Cl.
CPC . *G06T 5/002* (2013.01); *G06T 5/50* (2013.01); *G06T 2207/20192* (2013.01)

(58) Field of Classification Search
None
See application file for complete search history.

(56) References Cited

U.S. PATENT DOCUMENTS

| 8,194,160 | B2 | 6/2012 | Tsuruoka | |
|---|---|---|---|---|
| 8,687,907 | B2 | 4/2014 | Toyoda et al. | |
| 2003/0053159 | A1* | 3/2003 | Ito | H04N 1/58 358/518 |
| 2008/0122953 | A1* | 5/2008 | Wakahara | G06T 5/10 348/241 |
| 2010/0128147 | A1* | 5/2010 | Chang | G06T 5/002 348/241 |

FOREIGN PATENT DOCUMENTS

| JP | 3939428 | 7/2007 |
|---|---|---|
| JP | 2011-049696 | 3/2011 |
| JP | 4837503 | 12/2011 |
| WO | 2010/086973 | 8/2010 |

OTHER PUBLICATIONS

U.S. Appl. No. 14/317,273, filed Jun. 27, 2014.

* cited by examiner

*Primary Examiner* — Eueng-Nan Yeh
(74) *Attorney, Agent, or Firm* — IPUSA, PLLC

(57) ABSTRACT

An image processing device includes a first production part configured to apply a first smoothing process to an original image data by using a first edge-preserving smoothing filter to produce first image data that include a low-frequency image and an edge image, a second production part configured to apply a second smoothing process to a differential image between the original image data and the first image data to produce second image data that include a high-frequency image, and a synthesis part configured to synthesize the first image data and the second image data.

7 Claims, 14 Drawing Sheets

IMAGE PROCESSING DEVICE AND IMAGE PROCESSING METHOD

BACKGROUND OF THE INVENTION

1. Field of the Invention

An aspect of the present invention relates to at least one of an image processing device and an image processing method.

2. Description of the Related Art

As a typical noise that degrades image quality, a granularity or a tone jump is known. A granularity refers to a pattern like a fine dot to be found in a flat area of an image and a tone jump refers to a state that a tone discretely changes in an image.

Because such a noise is caused more explicitly in a case where image processing such as a tone transformation is executed, it is desirable to preliminarily reduce the noise by using a smoothing filter or the like.

However, in a case where a smoothing filter or the like is used, there is a problem that a detail of an image, such as a texture or an edge, is impaired, although it is possible to suppress a "noise" on an image such as a granularity or a tone jump. Accordingly, an image processing technique is desired that is capable of reducing a noise while a detail is maintained.

Herein, for example, Japanese Patent No. 3939428 proposes an image processing technique capable of reducing a noise while an edge is maintained, wherein an edge-preserving smoothing process is executed for original image data and a differential value is calculated between post-processing image data and pre-processing original image data.

However, in a case of an image processing technique disclosed in Japanese Patent No. 3939428, it is not possible to maintain a texture although an edge as a detail is maintained. This is because it is not possible to extract a high-frequency image such as a texture from original image data by merely executing an edge-preserving smoothing process and calculating a differential value between before and after the process so that it is not possible to eliminate only a noise.

SUMMARY OF THE INVENTION

According to one aspect of the present invention, there is provided an image processing device, including a first production part configured to apply a first smoothing process to an original image data by using a first edge-preserving smoothing filter to produce first image data that include a low-frequency image and an edge image, a second production part configured to apply a second smoothing process to a differential image between the original image data and the first image data to produce second image data that include a high-frequency image, and a synthesis part configured to synthesize the first image data and the second image data.

According to another aspect of the present invention, there is provided an image processing device, including a first production part configured to apply a first smoothing process to an original image data by using a first edge-preserving smoothing filter to produce intermediate image data that include a low-frequency image, a middle-frequency image, and an edge image, and apply a second smoothing process to the intermediate image data by using a second edge-preserving smoothing filter with a smoothing strength stronger than that of the first edge-preserving smoothing filter to produce first image data that include a low-frequency image and an edge image, a second production part configured to calculate a differential value between the original image data and the intermediate image data to produce second image data that include a high-frequency image, and a synthesis part configured to synthesize the first image data and the second image data.

According to another aspect of the present invention, there is provided an image processing method, including a first production step of applying an edge-preserving smoothing process to an original image data to produce first image data that include a low-frequency image and an edge image, a second production step of applying a smoothing process to a differential image between the original image data and the first image data to produce a second image data that include a high-frequency image, and a synthesis step of synthesizing the first image data and the second image data.

DETAILED DESCRIPTION OF THE PREFERRED EMBODIMENTS

Figure 1:
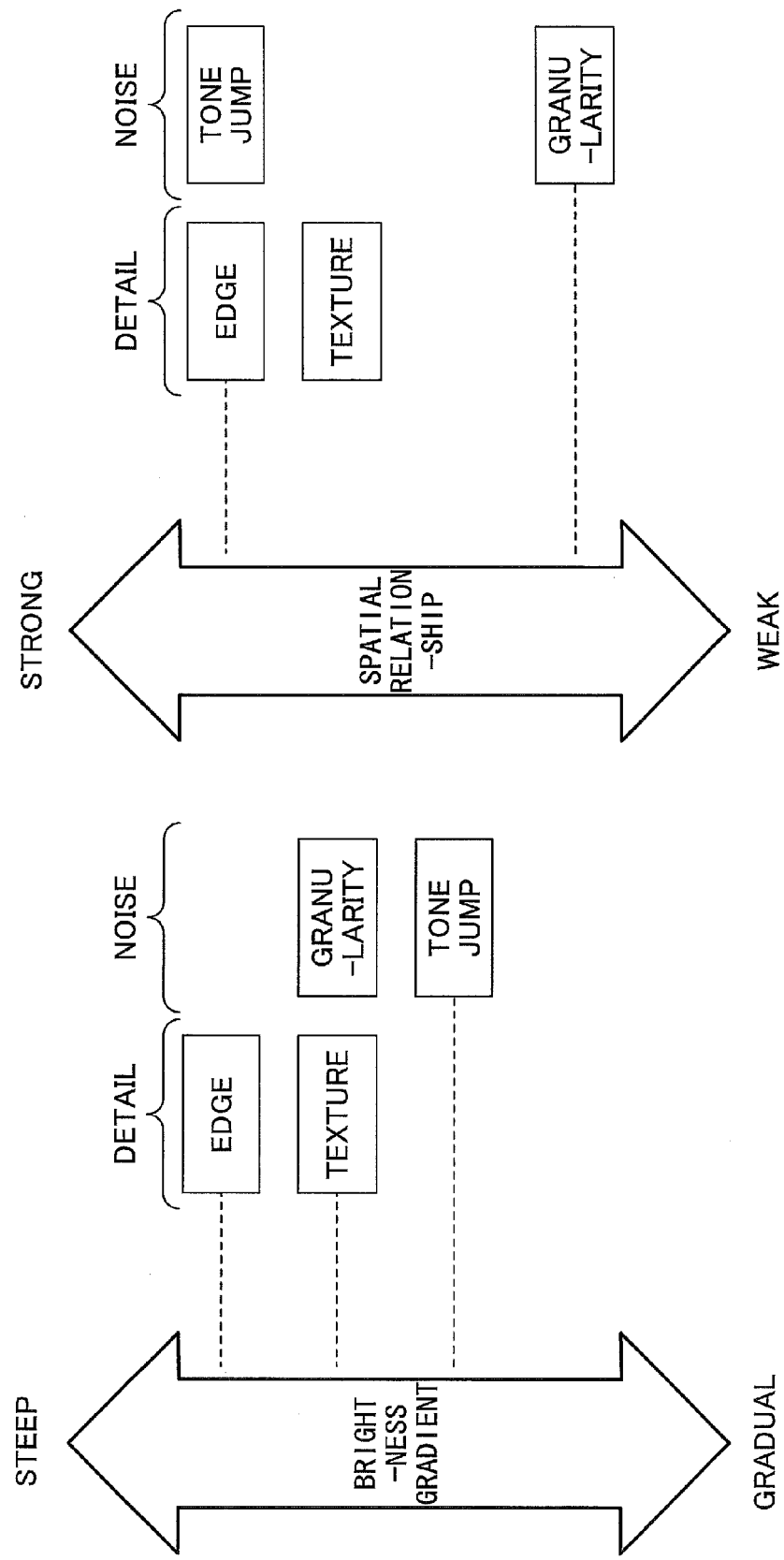
FIG. 1 is a conceptual diagram that illustrates characteristics of a detail and a noise.

An embodiment of the present invention will be described below with reference to the accompanying drawings. Here, in the present specification and the drawings, an identical reference numeral or symbol is attached to a component that has a substantially identical functional configuration so that a redundant description thereof is omitted.

A First Ebodiment

<1. A Description for a Characteristic of Each Element that Influences Image Quality and a Characteristic of an Edge-Preserving Smoothing Filter to Be Used for Image Processing>

First of all, characteristics of a detail (edge or texture) and a noise (granularity or tone jump) will be described simply that are focused on as elements that influence image quality as an image processing device according to the present embodiment (wherein a detailed configuration will be described below) executes image processing.

<1.1 Characteristics of a Detail and a Noise>

First, characteristics of a detail and a noise will be described that are elements that influence image quality. FIG. 1 is a conceptual diagram that illustrates characteristics of a detail (edge or texture) and a noise (granularity or tone jump) that are included in image data.

As a detail (edge or texture) and a noise (granularity or tone jump) that are included in image data are analyzed from the viewpoints of a tendency of brightness gradient and a tendency of a spatial relationship between pixels as illustrated in FIG. 1, it is possible to be summarized as follows.

An "edge" is such that a brightness gradient is steep and a spatial relationship between pixels is strong.

A "texture" is such that a brightness gradient is slightly steep and a spatial relationship between pixels is strong.

A "granularity" is such that a brightness gradient is slightly steep and a spatial relationship between pixels is weak.

A "tone jump" is such that a brightness gradient is slightly gradual and a spatial relationship between pixels is strong.

<1.2 A Difference Between Characteristics of a Texture and a Granularity>

Next, a difference between a texture and a granularity will further be described among characteristics of the respective elements described above. As described in 1.1 above, a texture and a granularity are similar in that a tendency of a brightness gradient is slightly steep. On the other hand, tendencies of a spatial relationship between pixels are greatly different. As this point is analyzed from the viewpoint of a directional property of a brightness distribution, it is possible to find that:

a "texture" and a "granularity" are such that brightness distributions are similar as viewed from a certain direction while the brightness distributions are greatly different as viewed from a direction orthogonal thereto.

Figure 2A:
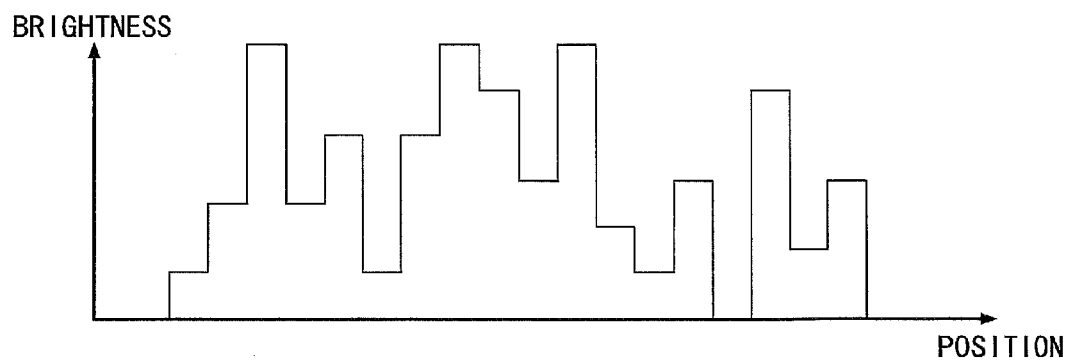
FIG. 2A and FIG. 2B are diagrams that illustrate a difference between characteristics of a detail (texture) and a noise (granularity).
Figure 2B:
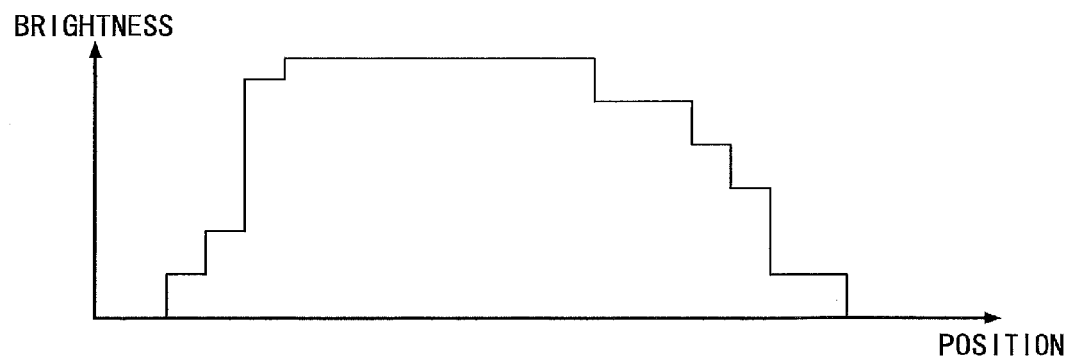

FIG. 2A and FIG. 2B are diagrams that straightforward illustrate a difference between characteristics of a texture and a granularity (diagrams that illustrate position-brightness characteristics), wherein FIG. 2A and FIG. 2B illustrate brightness distributions of a texture and a granularity in a certain direction and a brightness distribution of a texture in a direction orthogonal to that of FIG. 2A, respectively.

Whereas both a texture and a granularity are such that brightness distributions thereof are discrete in a certain direction as illustrated in FIG. 2A, the texture is continuous in a direction orthogonal thereto as illustrated in FIG. 2B (wherein the granularity is such that a brightness distribution thereof is discrete even in the direction orthogonal thereto). This is because a texture has a structure so that there is a direction in such a manner that a brightness distribution thereof is continuous, whereas a granularity does not have a structure so that that a brightness distribution thereof is discrete independently of a direction.

As one example of a texture, an area of hair of a person that is included in image data will be described. In an area of hair, a distribution with many irregularities in a radial direction is provided (that is, a brightness distribution like that in FIG. 2A is provided). On the other hand, a continuous distribution is provided in a direction toward a tip of hair (that is, a brightness distribution like that in FIG. 2B is provided).

Thus, a difference in continuity of a brightness distribution in a particular direction is caused between a texture and a granularity. Accordingly, a smoothing process is executed by an edge-preserving smoothing filter described below so that it is possible to eliminate only a granularity from image data that include a texture and the granularity.

<1.3 A Characteristic of a Tone Jump (a Characteristic with Respect to a Smoothing Process)>

Figure 3A:
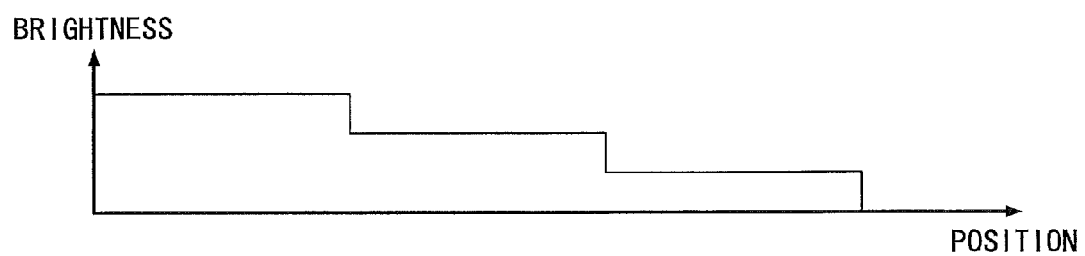
FIG. 3A, FIG. 3B, and FIG. 3C are diagrams that illustrate a characteristic of a noise (tone jump).

Next, a characteristic of a tone jump among characteristics of respective elements described above will be described in detail. FIG. 3A is a diagram that illustrates one example of a position-brightness characteristic of image data with a tone jump. As illustrated in FIG. 3A, a flat portion and a step are present in a case of a tone jump, although a brightness gradient is not as steep as an edge.

Figure 3B:
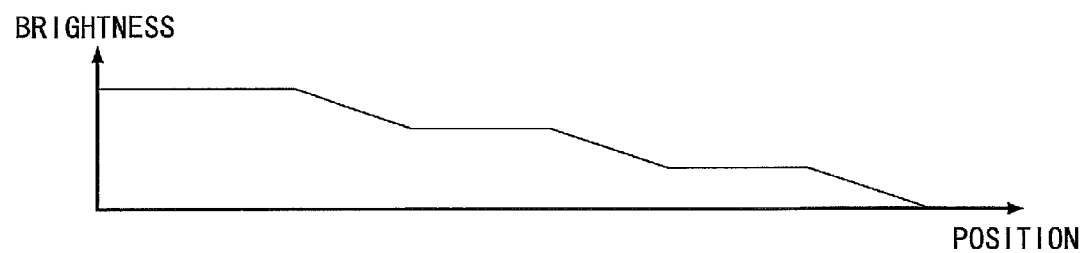

As a smoothing process is executed for such image data, a step is reduced as illustrated in FIG. 3B, so that a relatively smooth brightness change is provided. Here, a tone jump as illustrated in FIG. 3B is a tone jump that is referred to as a long-period variation.

Figure 3C:
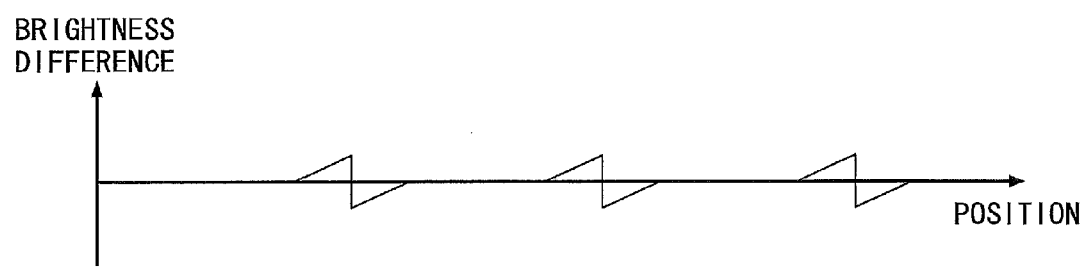

Herein, a differential value between image data before and after a smoothing process is executed is calculated, and a tone jump with along-period variation is eliminated as illustrated in FIG. 3C. Here, a tone jump remaining herein is a tone jump that is referred to as a tone jump with a short-period variation. As illustrated in FIG. 3C, a tone jump with a short-period variation has a characteristic that is an isolated local brightness change and a weak spatial relationship similar to that of a granularity.

Thus, as a smoothing process is executed for a tone jump and a differential value is calculated, it is possible to eliminate a long-period variation. Furthermore, a short-period variation that remains after executing a smoothing process and calculating a differential value has a characteristic of a spatial relationship similar to that of a granularity. Hence, it is possible to handle the short-period variation similarly to a granularity. In other words, it is also possible to eliminate a short-period variation of a tone jump as a smoothing process for eliminating a granularity is executed.

<1.4 A Characteristic of an Edge-Preserving Smoothing Filter>

Next, a characteristic of an edge-preserving smoothing filter will be briefly described that is used in an image processing device according to the present embodiment in order to realize image processing depending on a detail and a noise that have characteristics as described above.

(1) It is Possible to Maintain a Steep Edge of a Brightness Gradient

For one of characteristics of an edge-preserving smoothing filter, a characteristic is provided in such a manner that it is possible to maintain a steep edge of a brightness gradient. In general, an edge is impaired in a case where an edge-preserving smoothing filter is not used but a normal smoothing filter is used. Accordingly, it is necessary to address a problem as described above by executing a process for calculating a differential value or the like in order to maintain an edge, but in this case, there are various problems.

Figure 4A:
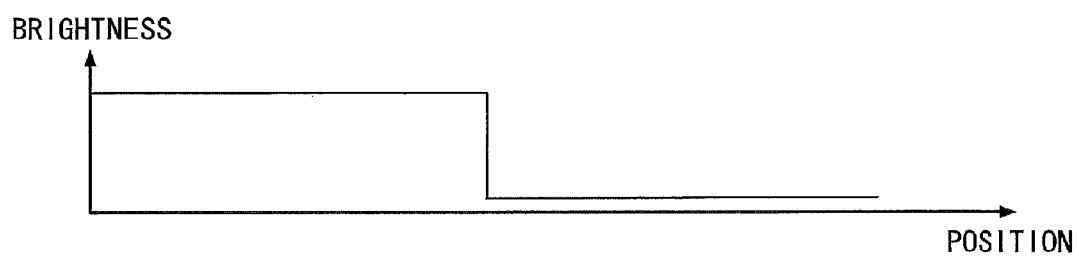
FIG. 4A, FIG. 4B, and FIG. 4C are diagrams that illustrate a characteristic of an edge-preserving smoothing filter.
Figure 4B:
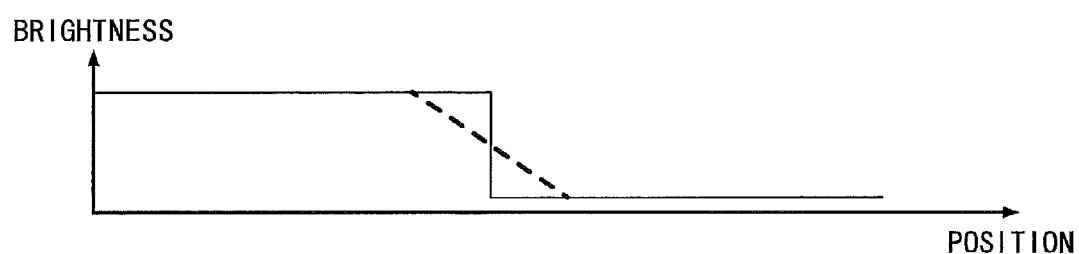
Figure 4C:
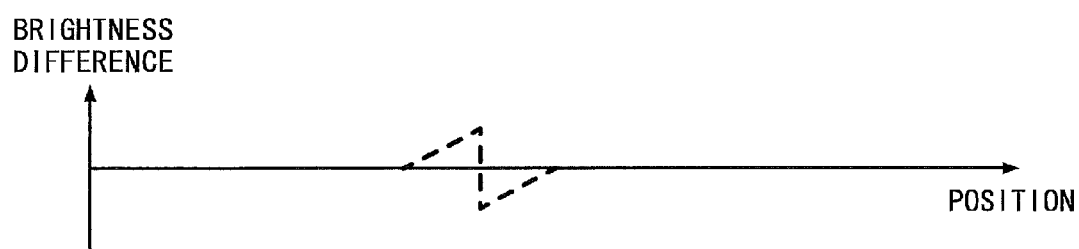

A specific description will be provided by using FIG. 4A, FIG. 4B, and FIG. 4C. FIG. 4A, FIG. 4B, and FIG. 4C are diagrams that illustrate a state that an edge image is processed by using a general smoothing filter. In a case where a smoothing process is executed by using a general smoothing filter, an edge image as illustrated in FIG. 4A provides an image with a relatively smooth edge as indicated by a dotted line in FIG. 4B. Herein, as a differential value between image data before and after a smoothing process is executed, a differential portion is produced near an edge as indicated by a dotted line in FIG. 4C.

If this differential image is emphasized, and added to image data after a smoothing process is executed, undershooting and overshooting are produced at left and right sides of an edge so that image data with an emphasized edge are obtained that is known as an unsharp mask.

Such an unsharp mask process is effective because a resolution of an image with a certain level of intensity is improved, but excessive one has a problem that a pattern (halo) near an edge is perceived. That is, in a case where a smoothing process is executed by using a general smoothing filter, a situation that causes a degradation of image quality may occur by a process for maintaining an edge.

On the other hand, in a case of an edge-preserving smoothing filter, it is possible to smooth another portion while a steep brightness gradient such as an edge is maintained. Hence, a process for maintaining an edge for a case where an edge image is processed by using a general smoothing filter is not required and a problem that a pattern is produced near an edge is not caused.

(2) It is Possible to Eliminate a Granularity with a Weak Spatial Relationship and a Tone Jump with a Short-Period Variation Moreover, there is an advantage in a case of an edge-preserving smoothing filter in such a manner that it is possible to be combined with a differential image so as to eliminate a granularity and a tone jump with a short-period variation and extract a texture. A specific description will be provided by providing a Bilateral Filter that is one example of an edge-preserving smoothing filter.

As a smoothing process is executed by a Bilateral Filter and a differential value between image data before and after the smoothing process is executed, a tone jump with a long-period variation is eliminated so that it is possible to obtain, as a differential image, image data that include a texture, a granularity, and/or a tone jump with a short-period variation.

As described above, whereas a texture has a characteristic that is a strong spatial relationship, a granularity and a tone jump with a short-period variation have characteristics that are weak spatial relationships. Then, it is possible to understand that a strong or weak spatial relationship is a continuity of a brightness distribution in a particular direction.

Herein, a Bilateral Filter has a term for a weight relating to a distance (a distance kernel) and a term for a weight relating to a brightness difference (a brightness difference kernel).

Therefore, a parameter for a Bilateral Filter is first set in such a manner that an effect of a relative brightness difference is reduced or suppressed, in order to extract only a texture from a differential image that includes the texture, a granularity, and a tone jump with a short-period variation. That is, setting is executed in such a manner that a brightness difference kernel is small. Moreover, a parameter is set in such a manner that an effect of a distance is large (a distance kernel is large). On that basis, it is sufficient to execute a smoothing process for such a differential image.

As described above, it is possible to maintain an edge image by using an edge-preserving smoothing filter. Moreover, it is possible to combine an edge-preserving smoothing filter with a differential image to eliminate a granularity with a weak spatial relationship and eliminate a tone jump with a short-period variation and extract a texture.

<2. A Configuration of an Image Processing Device>

Figure 5:
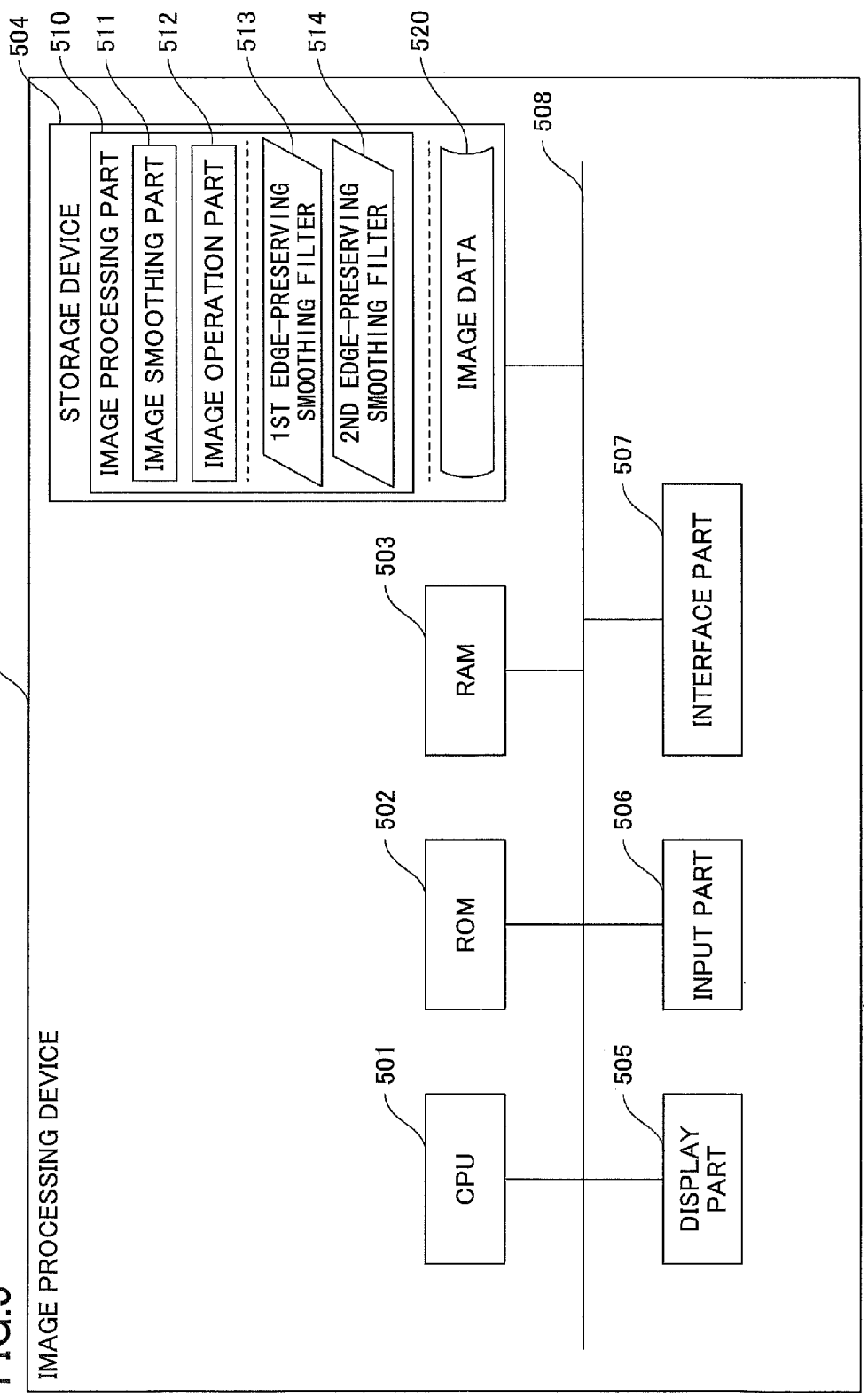
FIG. 5 is a diagram that illustrates one example of a configuration of an image processing device according to an embodiment.

Next, a configuration of an image processing device according to the present embodiment will be described that is capable of executing image processing in light of characteristics of the above-mentioned respective elements that influence image quality. FIG. 5 is a diagram that illustrates a configuration of an image processing device 500 according to the present embodiment.

As illustrated in FIG. 5, the image processing device 500 includes a Central Processing Unit (CPU) 501, a Read Only Memory (ROM) 501, a Random Access Memory (RAM) 503, and a storage device 504. Moreover, a display part 505, an input part 506, and an interface part 507 are included. Here, respective parts of the image processing device 500 are mutually connected through a bus 508.

The CPU 501 is a computer for executing a program stored in the storage device 504.

The ROM 502 is a non-volatile memory. The ROM 502 stores each kind of program, data, or the like, that is/are necessary for the CPU 501 to execute a program stored in the storage device 504. Specifically, a boot program such as a Basic Input/Output System (BIOS) or an Extensible Firmware Interface (EFI) is stored.

The ROM 503 is a main storage device such as a Dynamic Random Access Memory (DRAM) or a Static Random Access Memory (SRAM). The RAM 503 functions as a working space that is developed as a program stored in the storage device 504 is executed by the CPU 501.

The storage device 504 stores a program that functions as an image processing part 510, and image data 520. Here, a program that functions as the image processing part 510 further includes a program that functions as an image smoothing part 511 and a program that functions as an image operation part 512. Moreover, an edge-preserving smoothing filter 513 and an edge-preserving smoothing filter 514 are included that are used as the image smoothing part 511 executes a smoothing process.

The image processing device 500 executes image processing as described below, for image data (original image data) 520 as a program that functions as the image processing part 510 is executed by the CPU 501.

An edge-preserving smoothing process is executed for the image data 520 to extract a low-frequency image that includes an abstract structural component of the image data 520, and an edge image.

A differential value between the image data 520 and an extracted low-frequency image and edge image is calculated to extract a high-frequency image and a middle-frequency image that include a detailed structural component (a texture) and a non-structural component (a granularity and/or a tone jump with a short-period variation).

An edge-preserving smoothing process is executed for an extracted high-frequency image and middle-frequency image to eliminate a middle-frequency image that includes a non-structural component (a granularity and/or a tone jump with a short-period variation) and extract a high-frequency image that includes a detailed structural component (a texture).

An extracted low-frequency image and edge image and a high-frequency image that includes a detailed structural component (a texture) are synthesized to produce a synthetic image.

The display part 505 displays the image data 520 before image processing by the image processing part 510 and image data after image processing (a synthetic image). Furthermore, a setting screen for setting parameters for the edge-preserving smoothing filters 513 and 514 is displayed in a smoothing process by the image smoothing part 511.

The input part 506 is an operating member for executing each kind of operation (an instruction for executing image processing to and/or an operation for setting a parameter for the image processing part 510) for the image processing device 500, and includes, for example, a mouse, a key board, or the like.

The interface part 507 is connected to an external device and receives image data to be image-processed by the image processing part 510 or transmits image data having been image-processed to an external device.

<3. A Functional Configuration of an Image Processing Part in an Image Processing Device>

Figure 6:
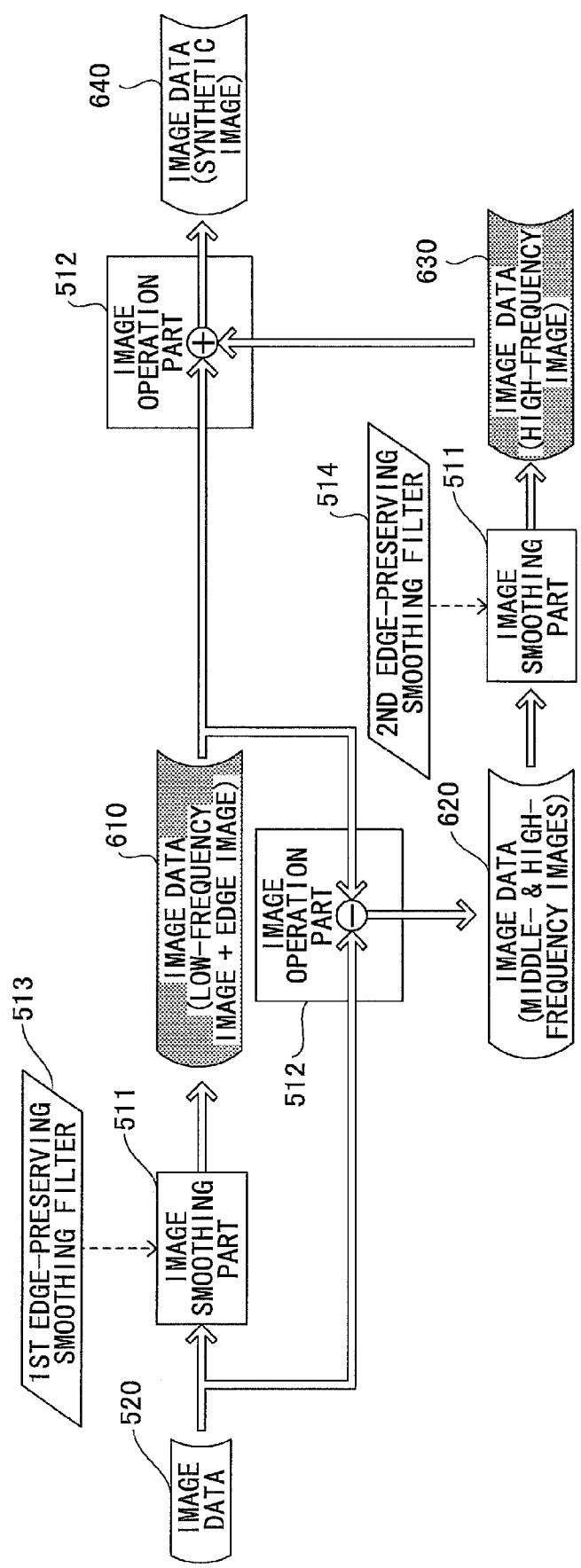
FIG. 6 is a block diagram that illustrates a functional configuration of an image processing part in an image processing device according to a first embodiment.

Next, a functional configuration of the image processing part 510 of the image processing device 500 will be described. FIG. 6 is a block diagram that illustrates a functional configuration of the image processing part 510 of the image processing device 500. As illustrated in FIG. 6, the image data (original image data) 520 are inputted to the image smoothing part 511.

In the image smoothing part 511 with the image data 520 having been inputted thereto, a smoothing process is executed for the image data 520 by using the edge-preserving smoothing filter 513 so that image data 610 are produced. The edge-preserving smoothing filter 513 is a filter with a high smoothing effect.

Hence, the image data 610 to be produced are composed of a low-frequency image that includes an abstract structural component (or includes a tone jump with a long-period variation) and an edge image that are included in the image data 520. Here, an edge image is a part of a high-frequency image but is dealt with separately from a high-frequency image in the present specification for the purpose of simplification of the description thereof. The produced image data 610 are inputted to the image operation part 512 together with the image data 520.

In the image operation part 512 with the image data 520 and the image data 610 having been inputted thereto, a differential value between the image data 520 and the image data 610 is calculated to produce the image data 620 that are a differential image. The image data 620 are composed of a high-frequency image that includes a detailed structural component (a texture) and a middle-frequency image that includes a non-structural component (a granularity and/or a tone jump with a short-period variation) (wherein a differential value is calculated to eliminate a tone jump with a long-period variation). The produced image data 620 are inputted to the image smoothing part 511.

In the image smoothing part 511 with the image data 620 having been inputted thereto, a smoothing process is executed for the image data 620 by using the edge-preserving smoothing filter 514 so that image data 630 are produced. The edge-preserving smoothing filter 514 is a filter with a smoothing effect lower than that of the edge-preserving smoothing filter 513.

Hence, the image data 630 to be produced are image data provided by eliminating a middle-frequency image that includes a non-structural component (a granularity and/or a tone jump with a short-period variation) from the image data 620, and are image data composed of a high-frequency image that includes a detailed structural component (a texture). The image data 630 are inputted to the image operation part 512 together with the image data 610.

In the image operation part 512 with the image data 610 and the image data 630 having been inputted thereto, the image data 610 and the image data 630 are synthesized so that image data 640 is produced that are a synthetic image. The image data 640 are composed of a low-frequency image that included an abstract structural component, an edge image, and a high-frequency image that includes a detailed structural component (a texture). That is, the image data 640 are produced in such a manner that a noise (a granularity and/or a tone jump) is reduced and a detail (an edge and/or a texture) is maintained, relative to the image data 520.

<4. A Flow of Image Processing>

Figure 7:
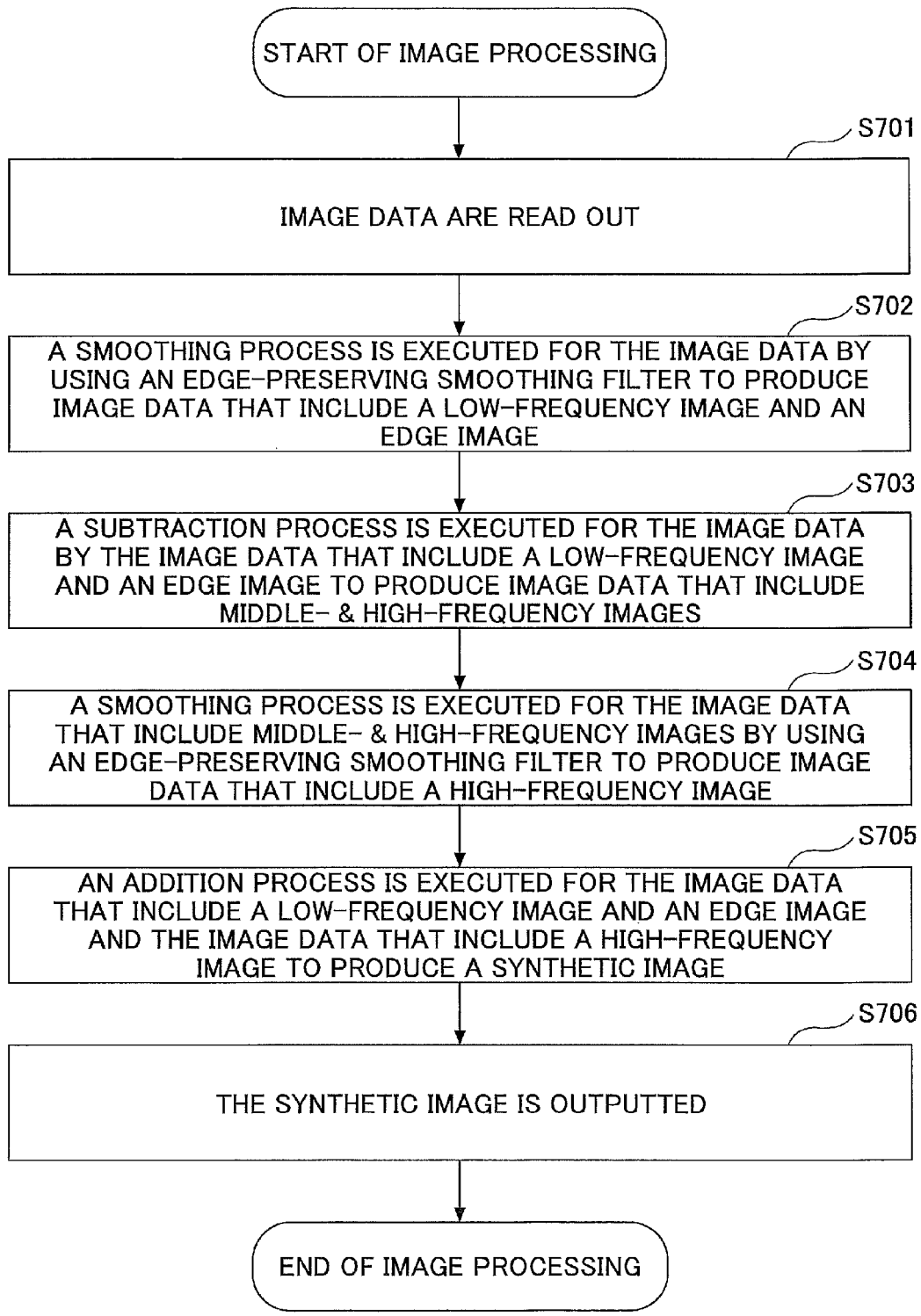
FIG. 7 is a flowchart that illustrates a flow of image processing to be executed by an image processing device according to a first embodiment.

Next, a flow of image processing in the image processing device 500 will be described. FIG. 7 is a flowchart that illustrates a flow of image processing in the image processing device 500. Image processing as illustrated in FIG. 7 starts in accordance with an instruction from a user.

At step S701, image data (original image data) 520 are read out that are stored in the storage device 504. Here, the image data 520 stored in the storage device 504 are, for example, such that one stored in a recording medium such as a CD, a DVD, or an HDD or a network storage is read out through the interface part 507 and stored therein. Alternatively, one read out in a non-illustrated image reading part is obtained through the interface part 507 and stored therein.

At step S702, a smoothing process is executed for the read-out image data 520 by using an edge-preserving smoothing filter so that image data 610 are produced that include a low-frequency image and an edge image. Here, for an edge-preserving smoothing filter used herein, it is possible to provide, for example, a Bilateral Filter, a Joint Bilateral Filter, a Guided Filter, or the like, as well as a median filter.

Here, a Joint Bilateral Filter is also referred to as a Cross Bilateral Filter.

At step S703, a differential value between the image data 520 and the image data 610 is calculated (that is, a subtraction process based on the image data 610 is executed for the image data 520) so that image data 620 are produced that include a middle-frequency image and a high-frequency image.

At step S704, a smoothing process is executed for the image data 620 that are produced at step S703 and include a middle-frequency image and a high frequency image, by using the edge-preserving smoothing filter 514, so that image data 630 are produced that include a high-frequency image.

At step S705, the image data 610 produced at step S702 and the image data 630 produced at step S704 are synthesized (that is, an addition process is executed between the image data 610 and the image data 630) so that image data 640 are produced that are a synthetic image. At step S706, the produced image data 640 are outputted.

<5. A Summary>

As is clear from the description provided above, an image processing device according to the present embodiment is such that:

a configuration is provided in such a manner that a smoothing process is executed for image data (original image data) by using an edge-preserving smoothing filter so that image data are produced that include a low-frequency image and an edge image;

a configuration is provided in such a manner that a smoothing process is further executed for a differential image between the image data (original image data) and the image data that include a low-frequency image and an edge image, by using an edge-preserving smoothing filter, so that image data are produced that include a high-frequency image; and a configuration is provided in such a manner that the image data that include a low-frequency image and an edge image and the image data that include a high-frequency image are synthesized so that a synthetic image is produced.

Thereby, it is possible to obtain image data with a maintained detail (edge and/or texture) and a reduced noise (granularity and/or texture).

A Second Embodiment

In the first embodiment described above, a configuration is provided in such a manner that a smoothing process is executed for the image data 620 that include a middle-frequency image and a high-frequency image by using an edge-preserving smoothing filter so as to produce image data that include a high-frequency image.

However, an embodiment of the present invention is not limited thereto. For example, a smoothing process may be executed for the image data 620 that include a middle-frequency image and a high-frequency image by using a smoothing filter so as to produce image data that include a middle-frequency image. Then, a configuration may be provided in such a manner that a differential value between image data that include a middle-frequency image and a high-frequency image and image data that include a middle-frequency image is calculated to produce image data that include a high-frequency image. The present embodiment will be described in detail below.

<1. A Functional Configuration of an Image Processing Part in an Image Processing Device>

Figure 8:
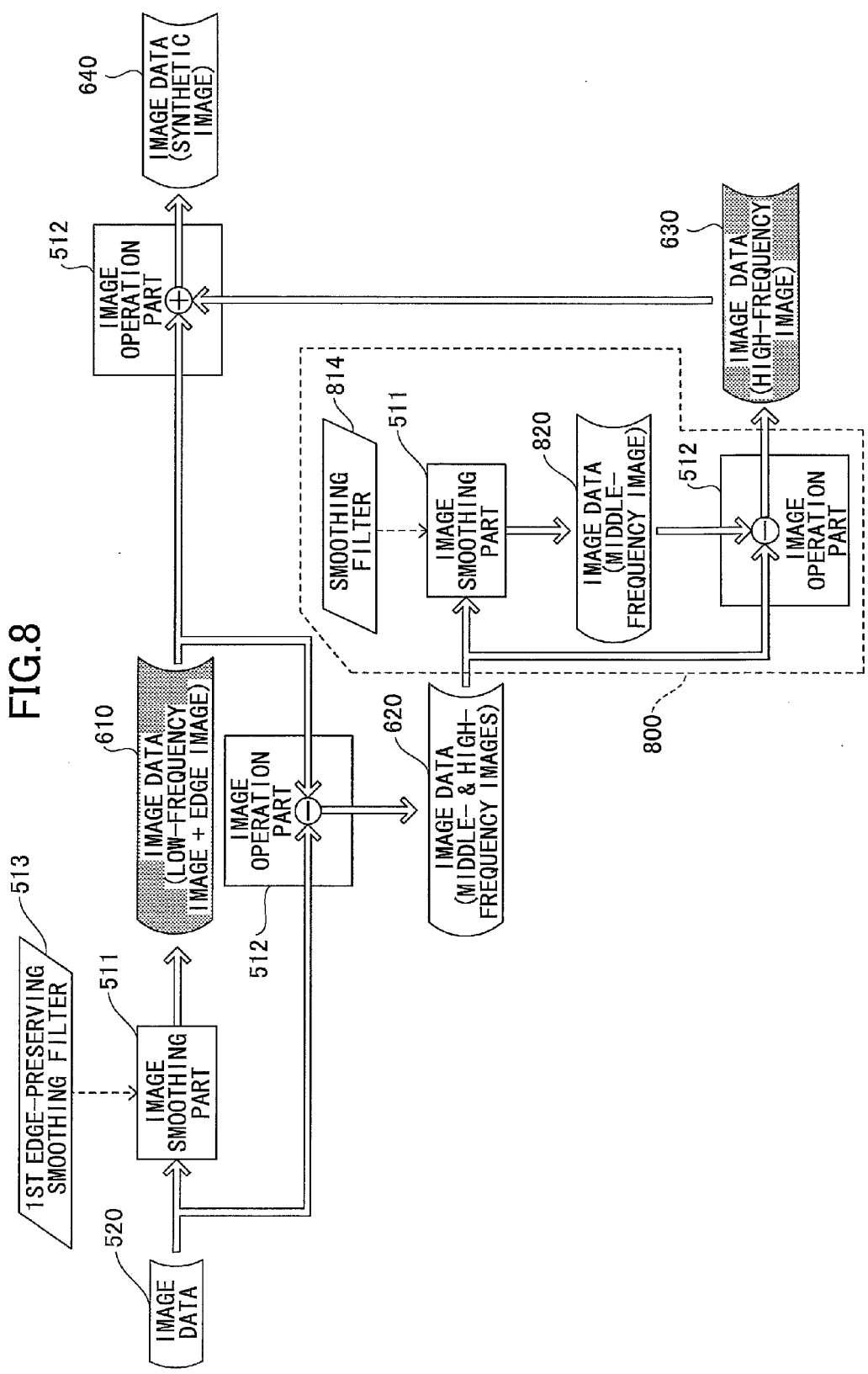
FIG. 8 is a block diagram that illustrates a functional configuration of an image processing part in an image processing device according to a second embodiment.

First, a functional configuration of an image processing part 510 of an image processing device 500 according to the present embodiment will be described. FIG. 8 is a block diagram that illustrates a functional configuration of the image processing part 510 in the image processing device 500 according to the present embodiment. Here, a difference from the functional configuration (FIG. 6) of the image processing part 510 of the image processing device 500 according to the first embodiment described above is a process indicated by a dotted line 800.

Specifically, such a process is to calculate image data 630 that include a high-frequency image from image data 620 that include a middle-frequency image and a high-frequency image. Then, a process indicated by the dotted line 800 will be described in detail below.

The image data 620 are composed of a high-frequency image that includes a detailed structural component (a texture) and a middle-frequency image that includes a non-structural component (a granularity and/or a tone jump with a short-period variation), are produced by an image operation part 512, and are inputted to an image smoothing part 511, as illustrated in FIG. 8.

In the image smoothing part 511, a smoothing process is executed for the image data 620 by using a smoothing filter 814. Herein, the smoothing filter 814 is a general smoothing filter for executing a smoothing process that also includes a process for an edge, differently from the edge-preserving smoothing filter 514. Specifically, it is possible to provide an averaging filter, a weighted average filter, a Gaussian filter, or the like.

Here, the image data 620 are a differential image between image data 520 and image data 610 (image data that include a low-frequency image and an edge image). Hence, an edge image is not included in the image data 620, so that there is also not provided contamination with a component originating from an edge that is produced by executing a smoothing process for an edge image by using the smoothing filter 814.

As a smoothing process is executed for the image data 620 by using the smoothing filter 814, a high-frequency image that includes a detailed structural component (a texture) is eliminated and image data 820 are produced that include a middle-frequency image that includes a non-structural component (a granularity and/or a tone jump with a short-period variation).

Hence, when the image data 820 that includes a middle-frequency image are produced from the image data 620 that include a middle-frequency image and a high-frequency image and further a differential value between both of them is calculated, it is possible to produce image data 630 that include a high-frequency image that includes a detailed structural component (a texture).

Specifically, the image data 620 that include a middle-frequency image that includes a non-structural component (a granularity and/or a tone jump with a short-period variation) and a high-frequency image that includes a detailed structural component (a texture) are inputted to the image operation part 512. Moreover, the image data 820 that include a middle-frequency image that includes a non-structural component (a granularity and/or a tone jump with a short-period variation) are inputted to the image operation part 512. Then, a differential value between both of them is calculated in the image operation part 512 to produce the image data 630 that include a high-frequency image that includes a detailed structural component (a texture).

<2. A Flow of Image Processing>

Figure 9:
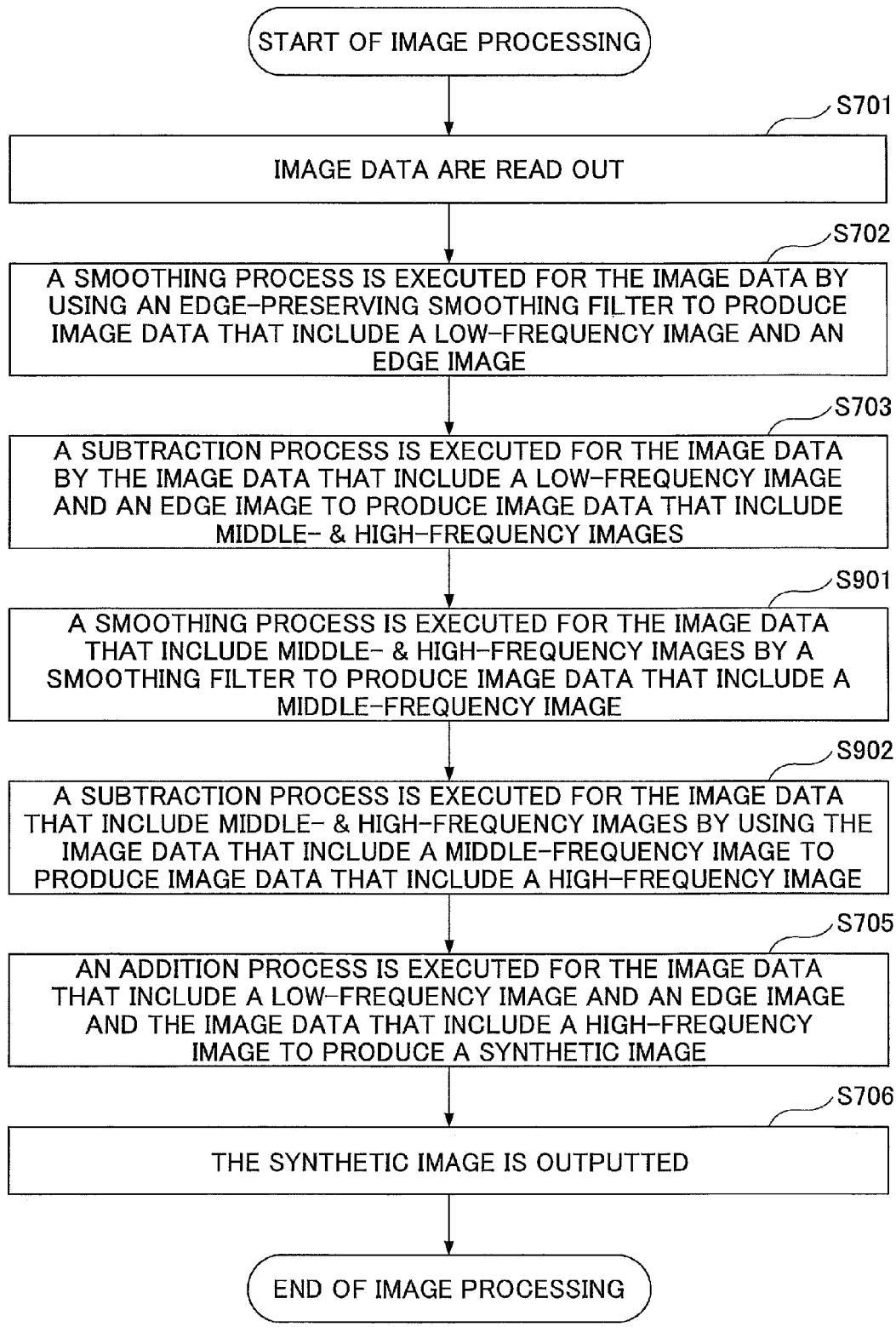
FIG. 9 is a flowchart that illustrates a flow of image processing to be executed by an image processing device according to a second embodiment.

Next, image processing according to the present embodiment in the image processing device 500 will be described. FIG. 9 is a flowchart that illustrates a flow of image processing according to the present embodiment in the image processing device 500. Here, a difference from the image processing (FIG. 7) to be executed in the image processing device 500 according to the first embodiment described above is a process indicated at step S901 and step S902. Hence, a process indicated at step S901 and step S902 will be described below.

At step S901, a smoothing process is executed for the image data 620 that include a middle-frequency image and a high-frequency image, by using the smoothing filter 814, so that the image data 820 are produced that include a middle-frequency image.

At step S902, a differential value between the image data 620 that include a middle-frequency image and a high-frequency image and the image data 820 that include a middle-frequency image is calculated so that the image data 630 are produced that include a high-frequency image.

<3. A Summary>

As is clear from the description provided above, an image processing device according to the present embodiment is such that:

a configuration is provided in such a manner that a smoothing process is executed for image data (original image data) by using an edge-preserving smoothing filter so that image data are produced that include a low-frequency image and an edge image;

a configuration is further provided in such a manner that a smoothing process is executed for a differential image between the image data (original image data) and the image data that include a low-frequency image and an edge image, by using a smoothing filter, so that image data are produced that include a middle-frequency image that includes a non-structural component (a granularity and/or a tone jump with a short-period variation);

a configuration is further provided in such a manner that a differential value between the differential image and the image data that include a middle-frequency image that includes a non-structural component (a granularity and/or a tone jump with a short-period variation) is calculated so that image data are produced that include a high-frequency image that includes a detailed structural component (a texture); and a configuration is provided in such a manner that the image data that include a low-frequency image and an edge image and the image data that include a high-frequency image are synthesized so that a synthetic image is produced.

Thereby, it is possible to maintain a detail (an edge and/or a texture) and reduce a noise (a granularity and/or a tone jump).

Here, the present embodiment is configured in such a manner that one edge-preserving smoothing filter and one smoothing filter are used instead of using two edge-preserving smoothing filters (that is, configured to reduce the number of edge-preserving smoothing filters to be used).

Thus, in a case where the number of edge-preserving smoothing filters to be utilized is reduced, an advantage is provided in such a manner that it is possible to reduce a cost of calculation in image processing. That is because an edge-preserving smoothing filter is such that a calculation of a weight for convolution is complicated, and results in a cost of calculation higher than that of a smoothing filter. Specifically, a weight for convolution is changed for each pixel in a case of an edge-preserving smoothing filter whereas a weight for convolution is common to entire image data (all pixels) in a case of a smoothing filter. Hence, it is necessary for an edge-preserving smoothing filter to recalculate a weight by a number of times that is identical to the number of pixels that constitute image data.

A Third Embodiment

The first embodiment described above is configured in such a manner that one edge-preserving smoothing filter is utilized to produce the image data 610 that include a low-frequency image and an edge image and further one edge-preserving smoothing filter is utilized to produce the image data 630 that include a high-frequency image. However, an embodiment of the present invention is not limited thereto. For example, a configuration may be provided in such a manner that one edge-preserving smoothing filter is utilized to produce the image data 630 that include a high-frequency image and further one edge-preserving smoothing filter is utilized to produce the image data 610 that include a low-frequency image and an edge image. The present embodiment will be described in detail below. <1. A Functional Configuration of an Image Processing Part in an Image Processing Device>

Figure 10:
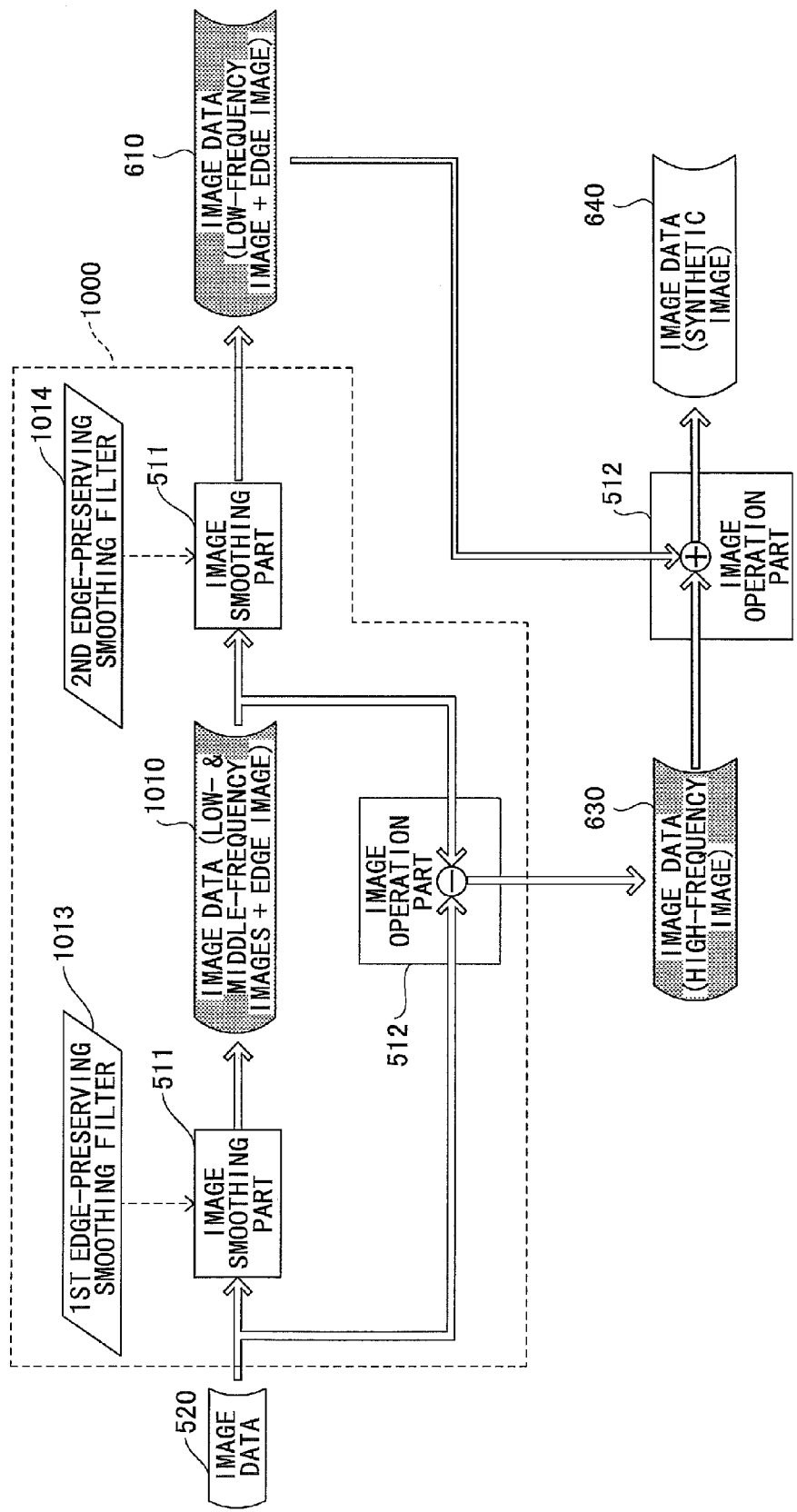
FIG. 10 is a block diagram that illustrates a functional configuration of an image processing part in an image processing device according to a third embodiment.

First, a functional configuration of an image processing part 510 of an image processing device 500 according to the present embodiment will be described. FIG. 10 is a block diagram that illustrates a functional configuration of the image processing part 510 of the image processing device 500 according to the present embodiment. Here, a difference from the functional configuration (FIG. 6) of the image processing part 510 of the image processing device 500 according to the first embodiment described above is a process indicated by a dotted line 1000. Then, a process indicated by the dotted line 1000 will be described below.

In an image smoothing part 511, a smoothing process is executed for image data 520 by using an edge-preserving smoothing filter 1013. Herein, the edge-preserving smoothing filter 1013 is a filter with a weak smoothing level as compared with the edge-preserving smoothing filter 513 used in the first embodiment described above.

A difference in a smoothing level influences a frequency component of image data for which a smoothing process is executed. In a case where a filter with a weak smoothing level is used, a higher-frequency component remains as compared with a case where a filter with a strong smoothing level is used.

Hence, as the image smoothing part 511 executes a smoothing process for the image data 520 by using the edge-preserving smoothing filter 1013, image data 1010 are produced that include a low-frequency image, a middle-frequency image that includes a granularity and a tone jump, and an edge image.

The image data 1010 that include a low-frequency image, a middle-frequency image that includes a granularity and a tone jump, and an edge image are inputted to an image operation part 512 together with the image data 520. In the image operation part 512, a differential value between the image data 520 and the image data 1010 is calculated so that image data 630 are produced that include a high-frequency image that includes a detailed structural component (a texture).

Furthermore, the image data 1010 that include a low-frequency image, a middle-frequency image that includes a granularity and a tone jump, and an edge image are inputted to the image smoothing part 511 so that a smoothing process is executed by using an edge-preserving smoothing filter 1014. Herein, the edge-preserving smoothing filter 1014 is a filter with a strong smoothing level as compared with the edge-preserving smoothing filter 1013.

Hence, in a case where a smoothing process is executed for the image data 1010 by using the edge-preserving smoothing filter 1014, a middle-frequency image that includes a granularity and a tone jump is eliminated so that image data 610 are produced that include a low-frequency image and an edge image.

<2. A Flow of Image Processing>

Figure 11:
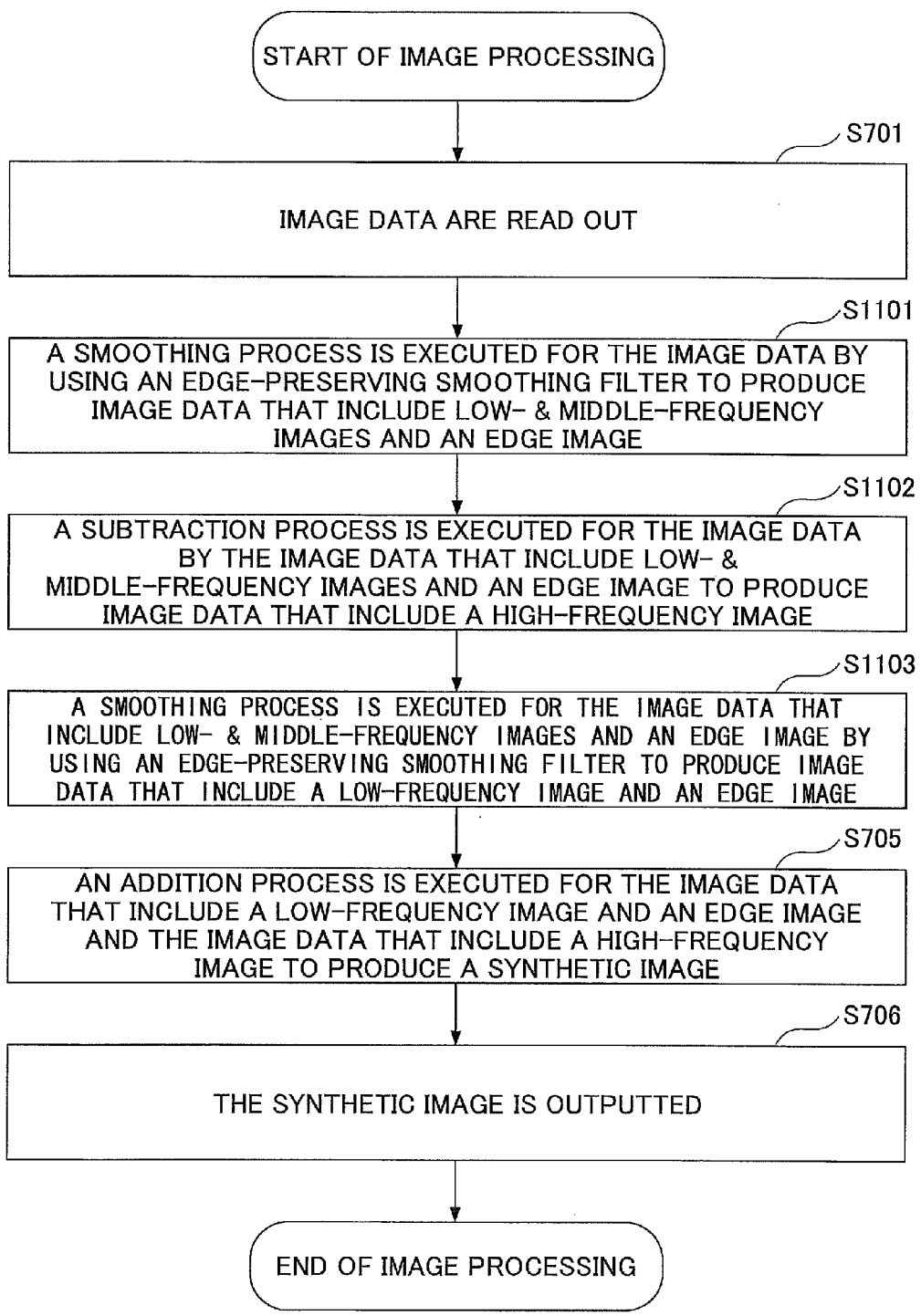
FIG. 11 is a flowchart that illustrates a flow of image processing to be executed by an image processing device according to a third embodiment.

Next, a flow of image processing according to the present embodiment in the image processing device 500 will be described. FIG. 11 is a flowchart that illustrates a flow of image processing in the image processing device 500. Here, a difference from the image processing (FIG. 7) to be executed in the image processing device 500 according to the first embodiment described above is a process indicated by step S1101-step S1103. Then, a process indicated by step S1101-step S1103 will be described below.

At step S1101, a smoothing process is executed for the image data 520 by using an edge-preserving smoothing filter so that the image data 1010 are produced that include a low-frequency image, a middle-frequency image that includes a granularity and a tone jump, and an edge image.

At step S1102, a differential value is calculated between the image data 1010 that are produced at step S1101 and include a low-frequency image, a middle-frequency image that includes a granularity and a tone jump, and an edge image, and the image data 520 read at step S701. Thereby, image data 630 are produced that include a high-frequency image that includes a detailed structural component (a texture).

At step S1103, a smoothing process is executed for the image data 1010 that are produced at step S1101 and include a low-frequency image, a middle-frequency image that includes a granularity and a tone jump, and an edge image, by using the edge-preserving smoothing filter 1014. Thereby, the image data 610 are produced that include a low-frequency image and an edge image.

<3. A Summary>

As is clear from the description provided above, an image processing device according to the present embodiment is such that:

a configuration is provided in such a manner that a smoothing process is executed for image data (original image data) by using an edge-preserving smoothing filter so that image data are produced that include a low-frequency image, a middle-frequency image that includes a granularity and a tone jump, and an edge image;

a configuration is further provided in such a manner that a differential value between the image data (original image data) and the image data that include a low-frequency image, a middle-frequency image that includes a granularity and a tone jump, and an edge image is calculated so that image data are produced that include a high-frequency image that includes a detailed structural component (a texture);

a configuration is further provided in such a manner that a smoothing process is executed for the image data that include a low-frequency image, a middle-frequency image that includes a granularity and a tone jump, and an edge image, by using an edge-preserving smoothing filter, so that image data are produced that include a low-frequency image and an edge image; and a configuration is further provided in such a manner that the image data that include a low-frequency image and an edge image and the image data that include a high-frequency image that includes a detailed structural component (a texture) are synthesized so that a synthetic image is produced.

Thereby, it is possible to maintain a detail (an edge and/or a texture) and reduce a noise (a granularity and/or a tone jump).

Here, the present embodiment is configured in such a manner that only one edge-preserving smoothing filter is used to produce image data that include a high-frequency image. Hence, for example, it is possible to reduce a cost of calculation in a case where only image data that include a high-frequency image are needed. Furthermore, image processing in the present embodiment is suitable for a case where it is desirable to acquire image data that include a high-frequency image prior to image data that include a low-frequency image and an edge image, or the like.

A Fourth Embodiment

A configuration in the first to third embodiments described above is provided in such a manner that image data that include a low-frequency image and an edge image and image data that include a high-frequency image are synthesized to produce a synthetic image but an embodiment of the present invention is not limited thereto.

For example, a configuration may be provided in such a manner that an image correction process is executed for each of image data that include a low-frequency image and an edge image and image data that include a high-frequency image and both of them are synthesized. Even when an image correction process is executed for these image data, a noise is not enhanced, because such a noise (a granularity and/or a tone jump) has been eliminated. The present embodiment will be described in detail below. <1. A Configuration of an Image Processing Device>

Figure 12:
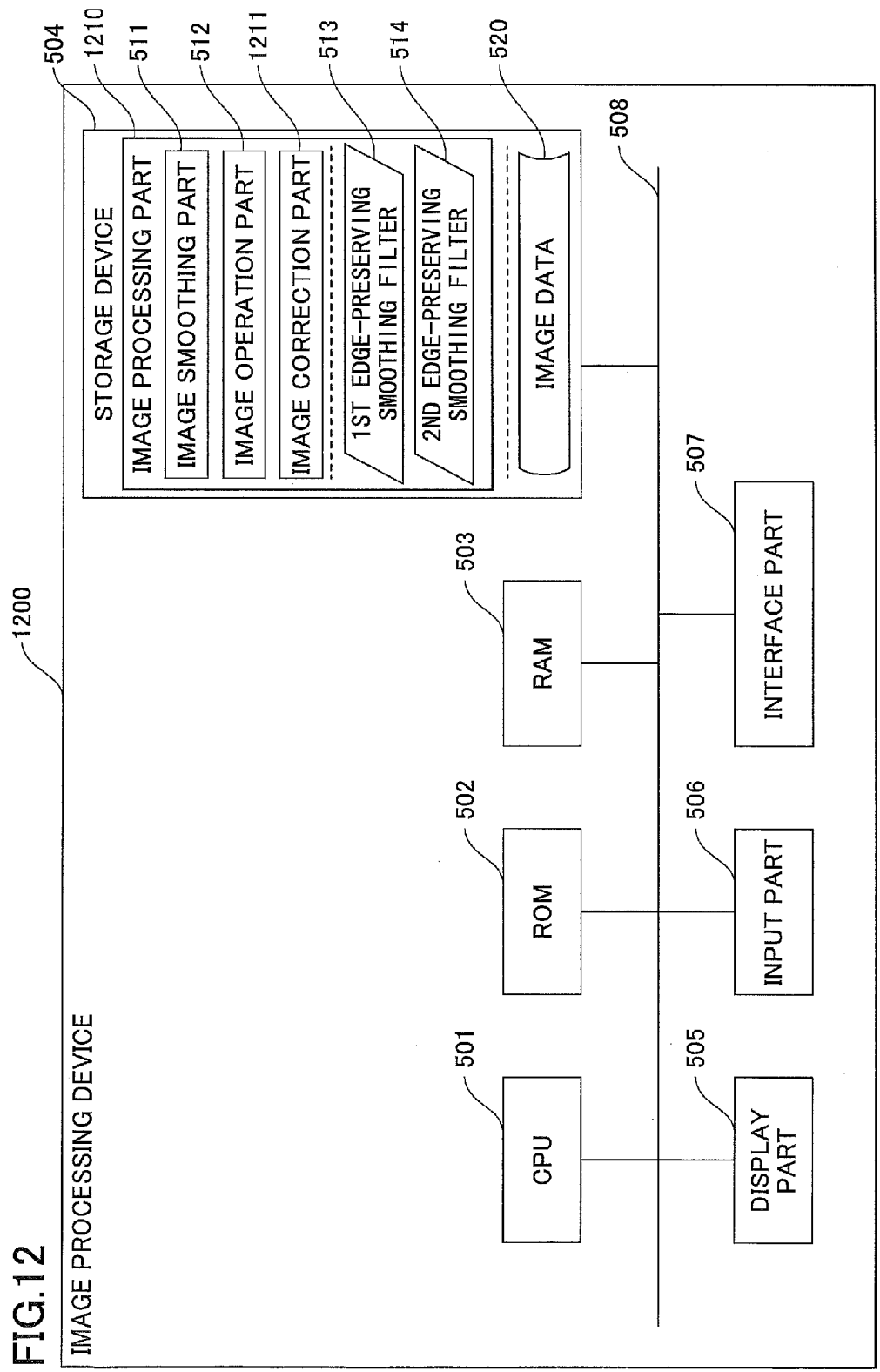
FIG. 12 is a diagram that illustrates another example of a configuration of an image processing device according to an embodiment.

First, a configuration of an image processing device according to the present embodiment will be described. FIG. 12 is a diagram that illustrates a configuration of an image processing device 1200 according to the present embodiment. Here, a difference from the image processing device 500 described by using FIG. 5 in the first embodiment described above is that a program that functions as an image correction part 1211 is stored in an image processing part 1210 of a storage device 504.

The image correction part 1211 executes a correction process for image data. A correction process to be executed by the image correction part 1211 includes a contrast correction, a tone curve correction, a level correction, a hue correction, a sharpness correction, or the like. <2. A Functional Configuration of an Image Processing Part in an Image Processing Device>

Figure 13:
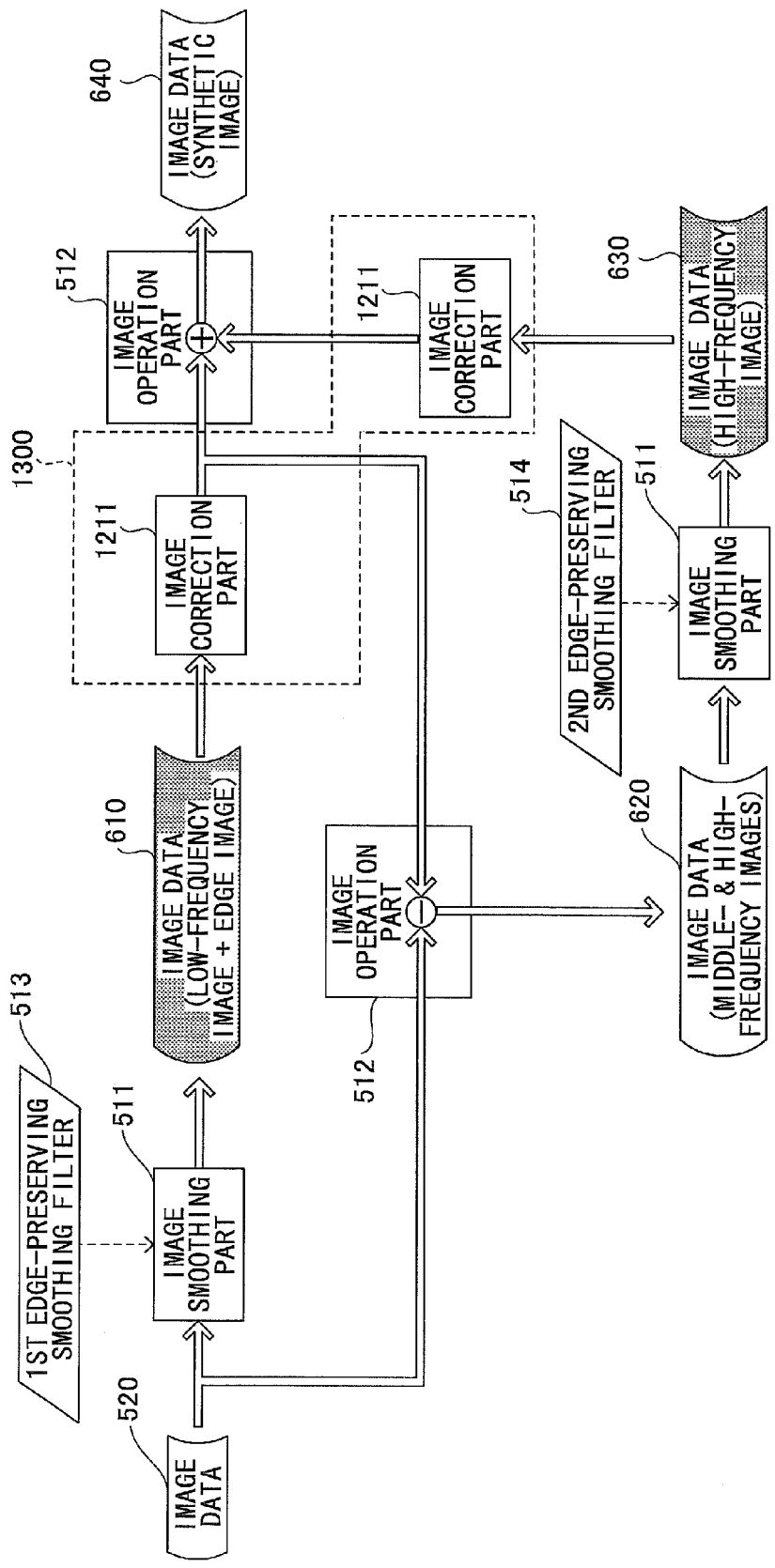
FIG. 13 is a block diagram that illustrates a functional configuration of an image processing part in an image processing device according to a fourth embodiment.

Next, a functional configuration of the image processing part 1210 in the image processing device 1200 will be described. FIG. 13 is a block diagram that illustrates a functional configuration of the image processing part 1210 in the image processing device 1200. Here, a difference from a functional configuration (FIG. 6) of the image processing part 510 in the image processing device 500 according to the first embodiment described above is a process indicated by a dotted line 1300. Specifically, the image correction part 1211 executes an image correction process for image data 610 that include a low-frequency image and an edge image, and the image correction part 1211 executes an image correction process for image data 630 that include a high-frequency image.

The image correction part 1211 executes a process of any one or any combination of a contrast correction, a tone curve correction, a level correction, a hue correction, and a sharpness correction, for the image data 610 that include a low-frequency image and an edge image.

Even when these image correction processes are executed for the image data 610 that include a low-frequency image and an edge image, a noise is not enhanced and a degradation of image quality is not caused, because a noise (a granularity and/or a tone jump) has been eliminated.

The image correction part 1211 may execute, for the image data 630 that include a high-frequency image, an image correction process similar to an image correction process to be executed for the image data 610 that include a low-frequency image and an edge image, or may execute a different image correction process. Even when these image correction processes are executed for the image data 630 that include a high-frequency image, a noise is also not enhanced and a degradation of image quality is also not caused, because a noise (a granularity and/or a tone jump) has been eliminated by an image smoothing part 511.

Here, with respect to a combination for a case where different image correction processes are executed for the image data 610 that include a low-frequency image and an edge image and the image data 630 that include a high-frequency image, it is possible to provide the following combinations:

a contrast correction: an image correction process for the image data 610 that include a low-frequency image and an edge image; and a sharpness correction: an image correction process for the image data 630 that include a high-frequency image.

It is possible to use a dynamic range of an image effectively, because a contrast of a low-frequency image is thus improved by executing a contrast correction for the image data 610. Furthermore, it is possible to leave a detail that tends to be blurred in a high-brightness or low-brightness portion, certainly, because a sharpness of a high-frequency image is improved by executing a sharpness correction for the image data 630.

<3. A Flow of Image Processing>

Figure 14:
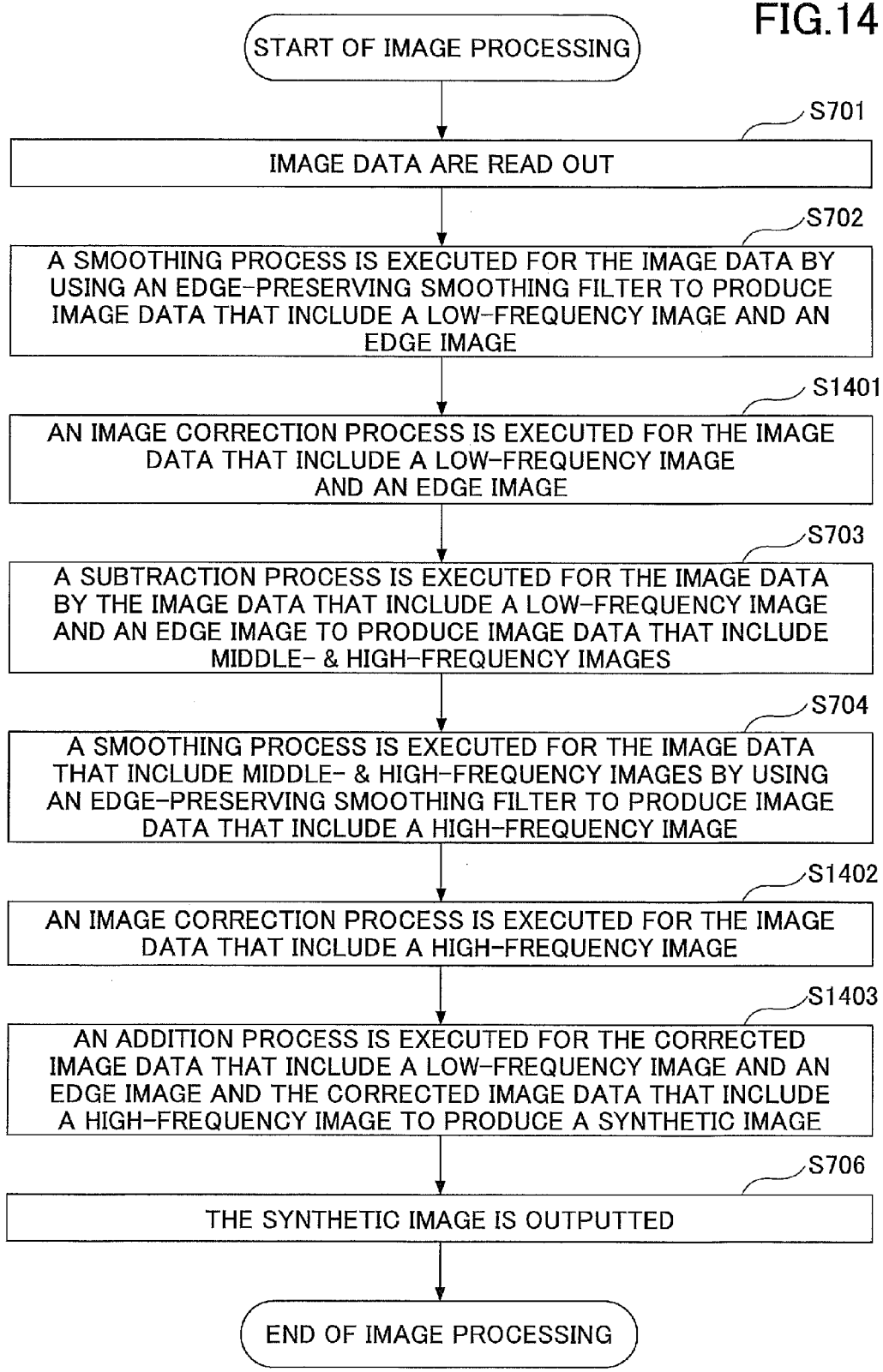
FIG. 14 is a flowchart that illustrates a flow of image processing to be executed by an image processing device according to a fourth embodiment.

Next, a flow of image processing in the image processing device 1200 according to the present embodiment will be described. FIG. 14 is a flowchart that illustrates a flow of image processing in the image processing device 1200. Here, a difference from the image processing (FIG. 7) to be executed by the image processing device 500 according to the first embodiment described above is a process indicated by step S1401, step S1402, and step S1403. Then, a process indicated by step S1401, step S1402, and step S1403 will be described below.

At step S1401, an image correction process is executed for the image data 610 that include a low-frequency image and an edge image. Furthermore, at step S1402, an image correction process is executed for the image data 630 that include a high-frequency image.

At step S1403, image data for which an image correction process has been executed at step S1401 and image data for which an image correction process has been executed at step S1402 are synthesized so that a synthetic image is produced.

<4. A Summary>

As is clear from the description provided above, an image processing device according to the present embodiment is such that:

a configuration is provided in such a manner that a smoothing process is executed for image data (original image data) by using an edge-preserving smoothing filter so that image data are produced that include a low-frequency image and an edge image, and further, an image correction process is executed for produced image data;

a configuration is further provided in such a manner that a smoothing process is executed for a differential image between the image data (original image data) and the image data that include a low-frequency image and an edge image, by using an edge-preserving smoothing filter, so that image data are produced that include a high-frequency image, and further an image correction process is executed for produced image data; and a configuration is provided in such a manner that the image data that include a low-frequency image and an edge image, wherein an image correction process has been applied to the image data, and image data that include a high-frequency image, wherein an image correction process has been applied to the image data, are synthesized so that a synthetic image is produced.

Thereby, it is possible to maintain a detail (an edge and/or a texture) and reduce a noise (a granularity and/or a tone jump). Furthermore, it is possible to enhance a detail without increasing a noise.

Here, although a configuration in the description provided above is such that an image correction process is executed for each of the image data 610 that include a low-frequency image and an edge image and the image data 630 that include a high-frequency image, to be synthesized, an embodiment of the present invention is not limited thereto.

For example, a configuration may be provided in such a manner that an image correction process is executed for image data 640 produced by synthesizing the image data 610 that include a low-frequency image and an edge image and the image data 630 that include a high-frequency image.

Furthermore, although a configuration in the description provided above is such that an image correction process is executed for the image data 610 that include a low-frequency image and an edge image, an image correction process is executed for the image data 630 that include a high-frequency image, and subsequently both of them are synthesized, an embodiment of the present invention is not limited thereto.

For example, a configuration may be provided in such a manner that the image data 610 for which an image correction process has been executed, the image data 630 for which an image correction process has been executed, and a middle-frequency image are synthesized. Thereby, even in a case where a detail is erroneously included in image data that include a middle-frequency image, it is possible to include such a detail in a synthetic image. Here, it is desirable to be configured in such a manner that synthesis is executed without executing an image correction process for a middle-frequency image, because a noise is included therein.

Furthermore, although a configuration in the description provided above is such that an image correction process is executed for both image data that include a low-frequency image and an edge image and image data that include a high-frequency image, an embodiment of the present invention is limited thereto, and a configuration may be provided in such a manner that an image correction process is executed for only one of them.

A Fifth Embodiment

Although the first embodiment described above is configured in such a manner that image data that include a low-frequency image and an edge image and image data that include a high-frequency image are produced by using two edge-preserving smoothing filters, an embodiment of the present invention is not limited thereto.

For example, a configuration may be provided in such a manner that a plurality of edge-preserving smoothing filters are used to produce image data that include a low-frequency image and an edge image from inputted image data (original image data). Thereby, it is possible to divide the inputted image data into frequency components with a narrower range, and it is possible to select finer frequency components to be used for a synthetic image.

Similarly, a configuration may be provided in such a manner that a plurality of edge-preserving smoothing filters are used to produce a high-frequency image from image data that include a middle-frequency image and such a high-frequency image. Thereby, it is possible to divide the image data that include a middle-frequency image and a high-frequency image into frequency components with a narrower range, and it is possible to select finer frequency components to be used for a synthetic image.

A Sixth Embodiment

The first embodiment described above is configured in such a manner that one edge-preserving smoothing filter is utilized to produce the image data 610 that include a low-frequency image and an edge image and one more edge-preserving smoothing filter is utilized to produce the image data 630 that include a high-frequency image. Then, although a combination of respectively utilized edge-preserving smoothing filters has not been referred to in the first embodiment described above in detail, it is possible to provide the following combinations for such a combination of edge-preserving smoothing filters. Here, an edge-preserving smoothing filter to be utilized to produce image data 610 that include a low-frequency image and an edge image will be referred to as a first edge-preserving smoothing filter below. Furthermore, an edge-preserving smoothing filter to be utilized to produce image data 630 that include a high-frequency image will be referred to as a second edge-preserving smoothing filter.

(1) Identical kinds of a first edge-preserving smoothing filter and a second edge-preserving smoothing filter are used and parameters thereof are also identical.

In such a case, there is an advantage of a facilitated design, because one kind of edge-preserving smoothing filter is used for image processing and only one parameter is provided. On the other hand, image data (original image data) 520 and image data 620 that include a middle-frequency image and a high-frequency image have different dynamic ranges. Hence, a problem is caused in such a manner that a relatively strong smoothing is provided when a smoothing process is executed for the image data 620 that include a middle-frequency image and a high-frequency image.

(2) Identical kinds of a first edge-preserving smoothing filter and a second edge-preserving smoothing filter are used but different parameters are used. In such a case, there is also an advantage of a facilitated design, because one kind of edge-preserving smoothing filter is used for image processing. Moreover, it is possible to mitigate a problem in (1) described above by changing parameters for the image data (original image data) 520 and the image data 620 that include a middle-frequency image and a high-frequency image. On the other hand, a complexity of a design is increased as compared with (1) described above, because it is necessary to prepare two kinds of parameters.

Specifically, a parameter for a strong smoothing level is used in a case where a Bilateral Filter is used as an edge-preserving smoothing filter to execute a smoothing process for the image data (original image data) 520. Furthermore, a parameter for a low smoothing level is used in a case where a smoothing process is executed for the image data 620 that include a middle-frequency image and a high-frequency image.

Here, it is possible to provide the following setting as setting of parameters for providing a low smoothing level.

a radius r of a filter window is reduced.

a standard deviation ad of a distance is reduced.

a standard deviation ai of a brightness difference is reduced.

It is desirable to set a small standard deviation ai of a brightness difference, because a dynamic range for the image data 620 that include a middle-frequency image and a high-frequency image is less than a dynamic range for the image data 520.

Furthermore, the image data 620 that include a middle-frequency image and a high-frequency image include a component with a relatively higher frequency than that of the image data 520. However, the reason why a smoothing process is executed for the image data 620 that include a middle-frequency image and a high-frequency image is to eliminate a component with a relatively low frequency. Therefore, it is desirable to provide a second edge-preserving smoothing filter with a smaller standard deviation ad of a distance than that of a first edge-preserving smoothing filter.

(3) different kinds of a first edge-preserving smoothing filter and a second edge-preserving smoothing filter are used and different parameters are used.

It is possible to use different filters and different parameters between a case where a smoothing process is executed for the image data (original image data) 520 and a case where a smoothing process is executed for the image data 620 that include a middle-frequency image and a high-frequency image. Hence, it is possible to increase a freedom for a smoothing effect. Specifically, a strong smoothing level is provided in a case where a smoothing process is executed for the image data (original image data) 520 and a weak smoothing level is provided in a case where a smoothing process is executed for the image data 620 that include a middle-frequency image and a high-frequency image.

On the other hand, a complexity of a design is increased as compared with (1) described above and (2) described above, because it is necessary to prepare two kinds of filters and parameters.

Here, for a combination of a first edge-preserving smoothing filter and a second edge-preserving smoothing filter, it is possible to provide the following combination:

a Bilateral Filter: a first edge-preserving smoothing filter;

a Joint Bilateral Filter: a second edge-preserving smoothing filter.

When a Joint Bilateral Filter is used, brightness components of the image data (original image data) 520 and the image data 610 that include a low-frequency image and an edge image are referred to. Thereby, it is possible to absorb a difference between dynamic ranges for the image data 520 and the image data 620 that include a middle-frequency image and a high-frequency image. As a result, it is also possible to provide a common value of a standard deviation σi of a brightness difference, between a first edge-preserving smoothing filter and a second edge-preserving smoothing filter.

Furthermore, for another example of a combination of a first edge-preserving smoothing filter and a second edge-preserving smoothing filter, it is possible to provide the following combination:

a median filter: a first edge-preserving smoothing filter;

a Bilateral Filter: a second edge-preserving smoothing filter.

Because a median filter eliminates a fine area that has a structure, a smoothing process is executed for the image data (original image data) 520 by using a median filter so that it is possible to maintain an edge and eliminate a fine structure.

It is possible for a Bilateral Filter to maintain an edge and leave a fine structure. Hence, a smoothing process is executed for the image data 620 by using a Bilateral Filter so that it is possible to smooth the image data 620 and maintain a fine structure present therein.

Other Embodiments

Although each of the embodiments described above is configured in such a manner that a program for realizing the image processing part 510 or 1210 is stored in the storage device 504 (a storage medium wherein a drive and a medium are integrated), an embodiment of the present invention is not limited thereto. For example, a configuration in a case where a drive and a medium are separate may be provided in such a manner that a recording medium is stored as a storage medium.

Here, an embodiment of the present invention is not limited to the configurations illustrated herein, such as a configurations provided in embodiments described above and combinations with other elements. In regard to these points, it is possible to be modified without departing from the spirit of an embodiment of the present invention and defined appropriately according to an application mode thereof.

Appendix

<An Illustrative Embodiment(s) of an Image Processing Device, an Image Processing Method, a Program, and a Storage Medium>

At least one illustrative embodiment of the present invention may relate to at least one of an image processing device, an image processing method, a program, and a storage medium.

At least one illustrative embodiment of the present invention may be provided by taking a problem(s) as described above into consideration, and at least one illustrative embodiment of the present invention may aim at providing an image processing technique that is capable of reducing a noise while a detail is maintained.

According to at least one illustrative embodiment of the present invention, there may be provided An image processing device according to at least one illustrative embodiment of the present invention may have a configuration as described below. That is, an image processing device that processes original image data is characterized by having a first production means that executes a smoothing process for the original image data by using an edge-preserving smoothing filter to produce first image data that includes a low-frequency image and an edge image, a second production means that executes a smoothing process for a differential image between the original image data and the first image data to produce second image data that include a high-frequency image, and a synthesis means that synthesizes the first image data and the second image data.

Illustrative Embodiment (1) is an image processing device that processes an original image data, wherein the image processing device is characterized by having a first production means that executes a smoothing process for the original image data by using an edge-preserving smoothing filter to produce first image data that include a low-frequency image and an edge image, a second production means that executes a smoothing process for a differential image between the original image data and the first image data to produce second image data that include a high-frequency image, and a synthesis means that synthesizes the first image data and the second image data.

Illustrative Embodiment (2) is the image processing device as described in Illustrative Embodiment (1), characterized in that the second production means executes a smoothing process for the differential image by using an edge-preserving smoothing filter to produce the second image data that include a high-frequency image.

Illustrative Embodiment (3) is the image processing device as described in Illustrative Embodiment (1), characterized in that the second production means calculates a differential value between image data obtained by executing a smoothing process for a differential image between the original image data and the first image data and the differential image to produce the second image data that include a high-frequency image.

Illustrative Embodiment (4) is the image processing device as described in Illustrative Embodiment (2), characterized in that an edge-preserving smoothing filter to be used by the first production means to execute a smoothing process and an edge-preserving smoothing filter to be used by the second production means to execute a smoothing process are such that kinds thereof are different.

Illustrative Embodiment (5) is the image processing device as described in Illustrative Embodiment (2), characterized in that an edge-preserving smoothing filter to be used by the first production means to execute a smoothing process and an edge-preserving smoothing filter to be used by the second production means to execute a smoothing process are such that kinds thereof are identical and parameters thereof are different.

Illustrative Embodiment (6) is an image processing device that processes original image data, wherein the image processing device is characterized by having a first production means that executes a smoothing process for the original image data by using a first edge-preserving smoothing filter to produce image data that include a low-frequency image, a middle-frequency image, and an edge image, and executes a smoothing process for the produced image data by using a second edge-preserving smoothing filter with a smoothing strength stronger than that of the first edge-preserving smoothing filter to produce first image data that include a low-frequency image and an edge image, a second production means that calculates a differential value between the image data that include a low-frequency image, a middle-frequency image, and an edge image and the original image data to produce second image data that include a high-frequency image, and a synthesis means that synthesizes the first image data and the second image data.

Illustrative Embodiment (7) is the image processing device as described in any one of Illustrative Embodiments (1) to (6), characterized by further having a correction means that executes an image correction process for either one or both of the first image data and the second image data.

Illustrative Embodiment (8) is an image processing method in an image processing device that processes original image data, wherein the image processing method is characterized by having a first production step that executes a smoothing process for the original image data by using an edge-preserving smoothing filter to produce first image data that include a low-frequency image and an edge image, a second production step that executes a smoothing process for a differential image between the original image data and the first image data to produce a second image data that include a high-frequency image, and a synthesis step that synthesizes the first image data and the second image data.

Illustrative Embodiment (9) is a program for causing a computer in an image processing device that processes original image data to execute a first production process that executes a smoothing process for the original image data by using an edge-preserving smoothing filter to produce first image data that include a low-frequency image and an edge image, a second production process that executes a smoothing process for a differential image between the original image data and the first image data to produce second image data that include a high-frequency image, and a synthesis process that synthesizes the first image data and the second image data.

Illustrative Embodiment (10) is a storage medium that stores a program for causing a computer in an image processing device that processes original image data to execute a first production process that executes a smoothing process for the original image data by using an edge-preserving smoothing filter to produce first image data that include a low-frequency image and an edge image, a second production process that executes a smoothing process for a differential image between the original image data and the first image data to produce second image data that include a high-frequency image, and a synthesis process that synthesizes the first image data and the second image data.

According to at least one illustrative embodiment of the present invention, it may be possible to provide an image processing technique that is capable of reducing a noise while a detail is maintained.

Although the illustrative embodiment(s) and specific example(s) of the present invention have been described with reference to the accompanying drawing(s), the present invention is not limited to any of the illustrative embodiment(s) and specific example(s), and the illustrative embodiment(s) and specific example(s) may be altered, modified, or combined without departing from the scope of the present invention.

The present application is based on and claims the benefit of priority to Japanese Patent Application No. 2013-239972 filed on Nov. 20, 2013, the entire content(s) of which is/are herein incorporated by reference.

What is claimed is:

1. An image processing device, comprising:
one or more memories storing instructions; and
one or more processors configured to execute the instructions stored in the one or more memories to implement steps of
applying a first smoothing process to an original image data by using a first edge-preserving smoothing filter to produce first image data that include a low-frequency image and an edge image;
applying a second smoothing process to a differential image between the original image data and the first image data to produce second image data that include a high-frequency image; and
synthesizing the first image data and the second image data.

2. The image processing device as claimed in claim 1, wherein the one or more processors are configured to apply the second smoothing process to the differential image by using a second edge-preserving smoothing filter to produce the second image data.

3. The image processing device as claimed in claim 2, wherein a kind of the first edge-preserving smoothing filter and a kind of the second edge-preserving smoothing filter are different from each other.

4. The image processing device as claimed in claim 2, wherein a kind of the first edge-preserving smoothing filter and a kind of the second edge-preserving smoothing filter are identical to each other and a parameter for the first edge-preserving smoothing filter and a parameter for the second edge-preserving smoothing filter are different from each other.

5. The image processing device as claimed in claim 1, wherein the one or more processors are configured to calculate a differential value between the differential image and image data obtained by applying the second smoothing process to the differential image to produce the second image data.

6. The image processing device as claimed in claim 1, wherein the one or more processors are configured to apply an image correction process to one or both of the first image data and the second image data.

7. An image processing method, comprising:
a first production step of applying an edge-preserving smoothing process to an original image data to produce first image data that include a low-frequency image and an edge image;
a second production step of applying a smoothing process to a differential image between the original image data and the first image data to produce a second image data that include a high-frequency image; and
a synthesis step of synthesizing the first image data and the second image data.

* * * * *